Patented Apr. 22, 1941

2,238,956

UNITED STATES PATENT OFFICE 2,238,956

VINYL RESIN EMULSION

Corneille O. Strother, Charleston, W. Va., assignor to Carbide and Carbon Chemicals Corporation, a corporation of New York No Drawing. Application June 7, 1938,
Serial No. 212,288

12 Claims. (Cl. 260—32)

This invention pertains to a stable form of an emulsion wherein a solution of a vinyl resin in a mixture of solvents as well as non-solvents for the resin constitutes the disperse phase of the emulsion and water comprises the continuous phase.

It is well known that an emulsion consists of an intimate dispersion of one liquid phase in another liquid with which the first liquid is inherently immiscible. This is achieved primarily by incorporating an emulsifying agent within the composition which acts to reduce the interfacial tension between the two phases. A film is thus formed around the droplets of the disperse phase. This film prevents the coalescence of the droplets. It is also known that the phase having the greater surface tension will become the disperse phase.

However, all emulsions represent inherently unstable systems since the emulsified phases are fundamentally immiscible. In addition, in many emulsions in which water forms the continuous phase, there is a tendency for the emulsion to undergo a reversal in phase and the water thus to become the disperse phase.

I have discovered that a solution of a vinyl resin, such as one of those resins which may result from the conjoint polymerization of a vinyl halide with a vinyl ester of an aliphatic acid, in a mixture of both a solvent and a non-solvent for the resin may be stably emulsified as the disperse phase in water. The solution referred to above may contain a number of components, and the formulation of a satisfactory emulsion that will deposit a continuous resin film is strictly dependent upon achieving a proper balance between the different components. For example, it is desirable to control the viscosity at 20° C. of the disperse phase at a value below about 40 poises. This is to insure that gel formation will not occur and that the disperse phase will be sufficiently fluid for satisfactory formation and application of the emulsion although, as discussed later, it is preferable that the disperse phase be thixotropic in character. The viscosity may be controlled by the proper adjustment of three variables, namely, the molecular weight of the resin, the resin concentration in the solvent vehicle, and the ratio of non-solvent to solvent in said vehicle. This viscosity of the disperse phase is a direct function of these variables.

Since my emulsions are primarily intended for use in coating materials, a satisfactory emulsion is one in which the resin solution permanently forms the disperse phase and the water remains as the continuous phase. Emulsions of the reverse type, namely, those in which water forms the disperse phase, are unsatisfactory for many coating applications.

Among solvents suitable for use in the dissolving mixture are ketones, certain chlorinated solvents, and lower aliphatic esters such as methyl amyl ketone, acetone, methyl ethyl ketone, methyl isobutyl ketone, methyl cyclohexanone, isophorone, propylene dichloride, ethylene dichloride, and butyl acetate. Among non-solvents suitable to be employed in the dissolving mixture are aromatic hydrocarbons, such as benzene, toluene, and xylene; chlorinated aromatic hydrocarbons, such as monochlortoluene; aliphatic hydrocarbons, such as petroleum fractions; hydrogenated naphthalenes, such as tetrahydronaphthalene; as well as other cyclic and naphthalenic hydrocarbons. Of these, it is preferred to use aromatic hydrocarbons as the principal constituent of the non-solvent portion of the solvent vehicle. It is to be understood that the term "non-solvent" means that the substance does not dissolve the resin at ordinary temperatures. Plasticizers may also be included in the dissolving mixture, such as tricresyl phosphate, dibutyl phthalate, di(beta-butoxyethyl) phthalate, and methyl phthalyl ethyl glycollate.

To prepare these stable emulsions, the resin solution is given a preliminary mixing with water containing an emulsifying agent, and the resulting mixture is thoroughly emulsified by passing it through a colloid mill or homogenizer. Examples of suitable emulsifying agents for use in my invention are both organic and inorganic salts of acid derivatives of the higher molecular weight hydrocarbons, such as sodium alkyl naphthalene sulfonate, sodium tetradecyl sulfate, morpholine tetradecyl sulfate, sodium lauryl sulfate, sodium heptadecyl sulfate, morpholine oleate, and triethanolamine tetradecyl sulfate.

It is preferred to use as emulsifying agents salts of acid derivatives of the higher aromatic hydrocarbons, such as sodium alkyl naphthalene sulfonate (products known by the trade name "Alkanol B" and the like), since somewhat more stable emulsions are produced thereby. This increase in stability may be due to the fact that aromatic hydrocarbons are more compatible with solutions of this vinyl resin than the aliphatic hydrocarbons.

It is important that any inorganic salt present in the commercial grade of these agents be removed in order to insure the stability of the emulsion. The concentration of these agents in the aqueous emulsion, in the case of sodium alkyl naphthalene sulphonate, is also critical. I have found that the degree of emulsification, that is to say, the particle size of the dispersed droplets, is, generally speaking, some function of this concentration. However, when an appropriate amount of emulsifying agent is employed in order to produce the maximum degree of emulsification, it has been found, in the case of sodium alkyl naphthalene sulfonate ("Alkanol B"), that the resulting emulsion ultimately undergoes a reversal in phase during storage. That is, the organic solvent constituent of the emulsion becomes the continuous phase and the water becomes the disperse phase. It has now been found that stable emulsions can be obtained by preparing the emulsion with an amount of sodium alkyl naphthalene sulfonate sufficient to produce a satisfactory dispersion but insufficient to cause a reversal in phase. If the emulsion is subsequently greatly diluted, additional emulsifying agent may be added to the water used for diluting it. This procedure also serves to reduce the emulsion to a lower viscosity.

It is also important to include a corrosion inhibitor in the emulsion when it is to be stored in metal containers. It is essential that the corrosion inhibitor, even though it be an electrolyte, does not act to break the emulsion. An example of such a corrosion inhibitor is sodium nitrite, which may be used in small amounts, about 0.2% by weight, in the aqueous phase of the emulsion.

It is significant that a mixture of acetone and an aromatic hydrocarbon may be utilized to dissolve the resin and the resulting solution may be emulsified as the disperse phase in water. Since acetone is completely miscible with water in all proportions, it is indeed surprising that a solution of the resin in a mixture of acetone and an aromatic hydrocarbon which is not a solvent for the resin could be emulsified with water without precipitation of the resin.

The boiling points of the solvents and non-solvents used to dissolve the resin should be balanced according to the nature of the surface to which the emulsion is to be applied and according to the type of coating which is to be formed. To form clear and continuous films on non-porous surfaces, such as metals, it is necessary to use high-boiling point solvents, such as methyl amyl ketone, as well as high-boiling point non-solvents, such as xylene or tetrahydronaphthalene. This is to insure that the water evaporates first from the coating. Otherwise, a cloudy or even discontinuous film would be formed owing to the precipitation of the resin by the water after the solvent-non-solvent mixture has evaporated. If the emulsion is to be applied to a porous surface, a more rapidly evaporating solvent mixture may be used. In this latter case, the porous surface will absorb the water, which is the continuous phase of the emulsion, and the resin film will be deposited on the surface. An example of a relatively rapid evaporating solvent mixture is one composed of equal parts of methyl isobutyl ketone and toluene.

However, if the emulsion is to be used for impregnating or binding fibrous materials, the above requirements need not necessarily apply. For such applications, it is not essential that the coating formed be either clear or continuous.

The resin preferred for use in the practice of this invention is that resulting from the conjoint polymerization of vinyl chloride with vinyl acetate. This resin may contain about 50% to about 95%, and most desirably from about 85% to about 90%, by weight of vinyl chloride in the polymer and may have an average molecular weight of from about 5,000 to about 20,000. The molecular weights are estimated from the specific viscosity of dilute solutions according to Staudinger's method.

The application of this conjointly polymerized resin to surfaces in the form of aqueous emulsions possesses numerous advantages over prior methods of utilizing this resin for coating purposes. It provides a greater flexibility in the formulation and application of the lacquer than has heretofore been possible. The emulsion may contain, at spraying viscosity, up to about 22% to 25% by weight of resin having a molecular weight of about 10,000, whereas the usual organic solvent lacquers must be thinned to a resin concentration of about 12% to 15% by weight to be of spraying viscosity. This is because solutions of the conjoint polymer exhibit the property of thixotropism at but moderately high solids content and this effectively prevents the application of such solutions as lacquers. On the contrary, the fluidity of the emulsified lacquer is provided by the aqueous continuous phase and the dispersed solution phase may be as thixotropic as desired without immobilization of the emulsion. The fluidity of the emulsified lacquer may be increased to a consistency still further adapted for spraying by mere dilution with water. In addition, a superior clear brushing lacquer may now be formulated with this resin since there is no tendency, when brushing the emulsified lacquer, for the solvent to affect any previously applied coat.

The following examples will serve to illustrate my invention more fully:

*Example 1*

A lacquer emulsion of the following proportions was formulated:

| | Parts by weight |
|---|---|
| Resin | 25 |
| Methyl n-amyl ketone | 45 |
| Toluene | 30 |
| Water | 33.3 |
| Sodium alkyl naphthalene sulfonate ("Alkanol B") | 1.2 |

The resin was one resulting from the conjoint polymerization of vinyl chloride with vinyl acetate which contained from about 85% to about 88% vinyl chloride in the polymer and which had an average molecular weight of about 10,000.

The emulsion was prepared as follows. The resin was dissolved in the mixture of solvent and non-solvent, and the resulting viscous and thixotropic solution was slowly mixed with water containing the emulsifying agent, the mixture being then thoroughly emulsified in a colloid mill. A stable emulsion was obtained. This emulsion is adapted for coating porous surfaces, such as cement, and it can be easily applied by brushing. Clear films having good adhesion to the cement were obtained, and the resin film was formed almost entirely on the surface of the cement. Furthermore, this lacquer coating is not affected by the alkaline character of the cement.

*Example 2*

A lacquer emulsion of the following proportions was formulated:

| | Parts by weight |
|---|---|
| Resin | 18.3 |
| Tricresyl phosphate | 3.7 |
| Methyl n-amyl ketone | 35.8 |
| Xylene | 16.5 |
| Tetrahydronaphthalene | 2.8 |
| Water | 22.5 |
| Sodium alkyl naphthalene sulfonate ("Alkanol B") | 0.46 |

The resin and the manner of preparing the emulsion were the same as those described in Example 1 and the disperse phase was likewise thixotropic in nature.

This lacquer emulsion is adapted for coating non-porous as well as porous surfaces. A clear film was deposited on a metallic surface without an excessive drying period. This lacquer emulsion may also be used to seal rough surfaces, such as fibre board. The surface, thus treated, is rendered better suited for painting.

Example 3

A lacquer emulsion of the following proportions was formulated:

| | Parts by weight |
|---|---|
| Resin | 7.6 |
| Methyl isobutyl ketone | 5.6 |
| Methyl n-amyl ketone | 5.6 |
| Xylene | 5.6 |
| Toluene | 39.1 |
| Tricresyl phosphate | 1.5 |
| Water | 34.3 |
| Sodium alkyl naphthalene sulfonate ("Alkanol B") | 0.7 |

The resin and the manner of preparing the emulsion were the same as described in Example 1.

A point of distinction between the above emulsion and that of Example 1 is the greater fluidity of the disperse phase of this emulsion. It is illustrative of a lacquer emulsion adapted for application by spraying, and it was applied in this manner to wall paper. The coated paper was resistant to ink, grease, and oil, and it was found that stains produced by such materials could be readily removed without detriment to the coated paper by washing it with an aqueous soap solution.

These emulsions may be used for coating and impregnating papers, fabrics, and other fibrous materials. In sharp contrast to the use of organic solvent lacquers for this purpose, the continuous protective film is formed almost entirely on the surface. Paper containers, for example, may be coated in this manner. The coated product is highly resistant to water and oil and is admirably adapted for packaging foodstuffs and the like.

Example 4

Emulsions containing as the disperse phase a 25% by weight solution of the resin in a mixture of solvent and non-solvent were prepared by emulsifying the solution with water in the ratio of 3 parts of solution to 1 part of water. The concentration of the emulsifying agent, sodium alkyl naphthalene sulfonate, varied from 0.5% to 4% by weight of the aqueous phase. It was found that the degree of emulsification was a direct function of this concentration. However, emulsions containing 3% by weight or over of this particular emulsifying agent in the water phase tended to be unstable, ultimately changing on storage to a water-in-oil type. It has now been found possible to produce emulsions of good dispersion, stable on storage, by initially preparing the emulsion with less than 3% of the emulsifying agent. When the concentrated emulsion is to be applied, it may be diluted with water containing additional emulsifying agent. In this manner, a more stable dilute emulsion can be obtained.

Example 5

A lacquer emulsion of the following proportions was prepared:

| | Parts by weight |
|---|---|
| Resin | 13.5 |
| Acetone | 12.3 |
| Toluene | 49.2 |
| Water | 24.5 |
| Sodium alkyl naphthalene sulfonate ("Alkanol B") | .5 |

The resin was the same as that described in Example 1.

The resin was dissolved with stirring in the mixture of acetone and toluene. The resulting thixotropic solution was slowly mixed with water containing the specified amount of emulsifying agent. The resin did not precipitate during this operation. The mixture was thoroughly emulsified by passing it through a homogenizer. The emulsion obtained was stable and possessed good dispersion. It is illustrative of a very rapid drying lacquer emulsion.

Modifications of the compositions and methods disclosed will be apparent to those skilled in the art, and they are intended to be included within the scope of this invention as defined by the appended claims.

I claim:

1. As a coating composition, a stable emulsion comprising a disperse phase, said disperse phase being a thixotropic solution of a vinyl resin in a liquid composition including both a solvent and a non-solvent for the resin, and an aqueous continuous phase containing an emulsifying agent; said vinyl resin being substantially identical with that resulting from the conjoint polymerization of a vinyl halide with a vinyl ester of an aliphatic acid.

2. As a coating composition, a stable emulsion comprising a disperse phase, said disperse phase being a thixotropic solution of a vinyl resin in a liquid composition including both a solvent and a non-solvent for the resin, and an aqueous continuous phase containing an emulsifying agent; said vinyl resin being substantially identical with that resulting from the conjoint polymerization of a vinyl halide with a vinyl ester of an aliphatic acid.

3. As a coating composition, a stable emulsion comprising a disperse phase, said disperse phase being a thixotropic solution of a vinyl resin in a liquid composition including both a solvent and a non-solvent for the resin, and an aqueous continuous phase containing sodium heptadecyl sulfate as an emulsifying agent; said vinyl resin being substantially identical with that resulting from the conjoint polymerization of vinyl chloride with vinyl acetate.

4. As a coating composition, a stable emulsion comprising a disperse phase, said disperse phase being a thixotropic solution of a vinyl resin in a liquid composition including both a solvent and a non-solvent for the resin, and an aqueous continuous phase containing triethanolamine tetradecyl sulfate as an emulsifying agent; said vinyl resin being substantially identical with that resulting from the conjoint polymerization of vinyl chloride with vinyl acetate.

5. As a coating composition, a stable emulsion comprising a disperse phase, said disperse phase being a thixotropic solution of a vinyl resin in a liquid composition including both a solvent and a non-solvent for the resin, and an aqueous continuous phase containing not more than 3% by weight of a salt of an aromatic sulphonic acid; said vinyl resin being substantially identical with that resulting from the conjoint polymerization of a vinyl halide with a vinyl ester of an aliphatic acid.

6. As a coating composition, a stable emulsion comprising a disperse phase, said disperse phase being a thixotropic solution of a vinyl resin in a liquid composition including both a solvent and a non-solvent for the resin, and an aqueous continuous phase containing not more than 3% by weight of sodium alkyl naphthalene sulfonate; said vinyl resin being substantially identical with that resulting from the conjoint polymerization of vinyl chloride with vinyl acetate.

7. As a coating composition, a stable emulsion comprising a disperse phase, said disperse phase being a thixotropic solution of a vinyl resin in a liquid composition including both a ketone solvent and a non-solvent for the resin, and an aqueous continuous phase containing an emulsifying agent; said vinyl resin being substantially identical with that resulting from the conjoint polymerization of vinyl chloride with vinyl acetate.

8. As a coating composition, a stable emulsion comprising a disperse phase, said disperse phase being a thixotropic solution of a vinyl resin in a liquid composition including a ketone solvent and an aromatic hydrocarbon, and an aqueous continuous phase containing an emulsifying agent; said vinyl resin being substantially identical with that resulting from the conjoint polymerization of vinyl chloride with vinyl acetate and containing from about 50% to about 95% by weight of vinyl chloride in the polymer and having an average molecular weight of from about 5,000 to about 20,000.

9. As a coating composition, a stable aqueous emulsion comprising a disperse phase, said disperse phase being a thixotropic solution of a vinyl resin in a liquid composition including acetone and an aromatic hydrocarbon, the ratio between the vinyl resin, acetone and aromatic hydrocarbon being so adjusted that the resin is not precipitated by the water, and an aqueous continuous phase containing an emulsifying agent; said vinyl resin being substantially identical with that resulting from the conjoint polymerization of vinyl chloride with vinyl acetate.

10. As a coating composition, a stable emulsion comprising a disperse phase, said disperse phase being a thixotropic solution of a vinyl resin in a liquid composition including a ketone and an aromatic hydrocarbon, and an aqueous continuous phase containing not more than 3% by weight of sodium alkyl naphthalene sulfonate; said vinyl resin being substantially identical with that resulting from the conjoint polymerization of vinyl chloride with vinyl acetate and containing from about 85% to about 88% by weight of vinyl chloride in the polymer and having an average molecular weight of about 10,000.

11. Process for producing finely dispersed aqueous emulsions stable on storage, said emulsion containing a resin substantially identical with that resulting from the conjoint polymerization of vinyl chloride with vinyl acetate, which comprises dissolving said resin in a liquid composition including a ketone and an aromatic hydrocarbon to form a thixotropic solution and emulsifying this solution with water containing not more than about 3% of sodium alkyl naphthalene sulfonate, and thereafter diluting said emulsion with water containing additional amounts of said emulsifying agent.

12. Process for producing finely dispersed aqueous emulsions stable on storage, said emulsion containing a resin substantially identical with that resulting from the conjoint polymerization of vinyl chloride with vinyl acetate, which comprises dissolving said resin in a liquid composition including both a solvent and a non-solvent for the resin to form a thixotropic solution, and emulsifying this solution with water containing not more than about 3% of sodium alkyl naphthalene sulfonate, and thereafter diluting said emulsion with water containing additional amounts of said emulsifying agent.

CORNEILLE O. STROTHER.